US009129404B1

(12) United States Patent
Wagner (10) Patent No.: US 9,129,404 B1
(45) Date of Patent: Sep. 8, 2015

(54) MEASURING PHYSICAL OBJECTS AND PRESENTING VIRTUAL ARTICLES

(75) Inventor: Todd Garnet Wagner, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 95 days.

(21) Appl. No.: 13/613,469

(22) Filed: Sep. 13, 2012
(Under 37 CFR 1.47)

(51) Int. Cl.
*G09G 5/00* (2006.01)
*G06T 3/40* (2006.01)

(52) U.S. Cl.
CPC .................................... *G06T 3/40* (2013.01)

(58) Field of Classification Search
CPC ..... G09G 5/14; G09G 5/391; G09G 2340/00; G09G 2340/04; G09G 2340/0407; G09G 2340/0414; G06T 3/40; G06T 3/4007; G06T 3/405; G06T 11/00; G06T 11/60
See application file for complete search history.

(56) References Cited

U.S. PATENT DOCUMENTS

| 8,558,872 | B1* | 10/2013 | Cho ................................ 348/43 |
| 2012/0038667 | A1* | 2/2012 | Branson et al. ............... 345/632 |
| 2012/0194547 | A1* | 8/2012 | Johnson et al. ............... 345/632 |
| 2012/0249741 | A1* | 10/2012 | Maciocci et al. ............. 345/633 |
| 2014/0368539 | A1* | 12/2014 | Yeh ............................... 345/633 |

* cited by examiner

*Primary Examiner* — James A Thompson
(74) *Attorney, Agent, or Firm* — Novak Druce Connolly Bove + Quigg LLP (57) ABSTRACT

An image of an environment including an object (i.e., object in reality, physical object) can be captured and be displayed by a computing device. The size of an image representation of the object can be determined. Information about a physical size of the object and about a distance between the computing device and the object in the environment can be obtained/determined. A comparison of the size of the image representation of the object and the physical size of the object can be used to calculate a scale for converting between an actual size of a real-world item and a size of the item as displayed. The information about the distance can optionally be used to determine/adjust/modify the scale. A virtual article depicting/representing a real-world article/item/object (i.e., real-world correspondence) can be displayed with the captured image. The virtual article displayed can be scaled to an appropriate size using the scale.

22 Claims, 10 Drawing Sheets

MEASURING PHYSICAL OBJECTS AND PRESENTING VIRTUAL ARTICLES

BACKGROUND

Computing devices are often used to make purchases. A user of a computing device can use his/her computing device to make an online purchase. There are various electronic marketplaces for the user to engage in online shopping. Online electronic marketplaces often provide pictures, descriptions, and other information for their products. Unlike physically shopping at a physical retail store, online shopping does not allow the user to examine the item in real life. For some items, such as software, providing just a picture and description is sufficient because the user does not need to examine the item in person. However, for some items, such as furniture, providing pictures and descriptions might give the user insufficient, inaccurate, and/or incomplete information. For example, a picture of a couch can appear smaller in the picture than it actually is in reality. Moreover, sometimes an item that the user believes to be appropriate and desirable based on online pictures and descriptions can turn out to be inappropriate or undesirable. The item can be inappropriate, for example, in that it does not fit in or match with the environment and surroundings where it is to be placed. The item can be undesirable, for example, if it does not look as good as portrayed in the online pictures and/or if it does not meet the user's expectations. As such, the user might need to return or exchange the inappropriate or undesirable item at the online electronic marketplace. This can be a waste of time, effort, and resources for both the user and the online electronic marketplace. Accordingly, it would be beneficial to provide the user with additional information, perspective, and/or interactivity in viewing, examining, and/or considering one or more items of interest.

BRIEF DESCRIPTION OF THE DRAWINGS

Various embodiments in accordance with the present disclosure will be described with reference to the drawings, in which.

DETAILED DESCRIPTION

Systems, devices, and methods in accordance with various embodiments of the present disclosure overcome one or more of the above-referenced and other deficiencies in conventional approaches to providing users with information about physical objects using electronic data. In particular, various embodiments can provide one or more virtual articles for display using an electronic device, where each virtual article depicts one or more corresponding physical objects, herein referred to as "real-world correspondences." For example, a virtual article can be a graphical depiction and/or representation of a physical object, such as a piece of furniture, a decoration, a piece of art (e.g., sculpture, sketch, painting, photograph, poster, etc.), an appliance, a textile (e.g., rug, curtains, bed sheet, etc.), a fixture (e.g., a ceiling fan, a light, a window, a mirror, a fireplace, etc.), a wall, a household item, etc.

In some embodiments, a virtual article can be scaled in size on the display screen with respect to other content displayed on the screen. For example, the scaling in size of the virtual article can be based at least in part upon measuring the size(s) of one or more objects in reality (i.e., physical objects) also being presented on the display screen. An object in reality (i.e., physical object in an environment) can be any real-world item, such as a piece of furniture, a decoration, a piece of art (e.g., sculpture, sketch, painting, photograph, poster, etc.), an appliance, a textile (e.g., rug, curtains, bed sheet, etc.), a fixture (e.g., a ceiling fan, a light, a window, a mirror, a fireplace, etc.), a wall, a household item, etc. Continuing with the scaling of the virtual article, in some embodiments the scaling can be based at least in part upon comparing a physical size of an object in reality (e.g., in an environment) with a size of an image representation of the object as displayed on the screen. For example, if an object in reality is 100 units long but (its image representation) appears to be 10 pixels long on the display, then the system can determine that 1 pixel of the image representation on the display screen corresponds to 10 units in reality. The system can thus scale the virtual article on screen to be a size that is one-tenth (i.e., 1/10) in pixels of what the correspondence in reality would be in actual units. As such, a scale (e.g., measurement scale), useful for converting between a size of an item in reality and a size of the item on the display screen, can be based at least in part upon comparing the actual size of an object in reality with the size of an image representation of the object as it would appear on the display screen. The measurement scale can be used to scale the virtual article in size to depict its real-world correspondence as it would appear in reality.

In some embodiments, the size of an object on the display screen can change as the distance between the object in reality and the computing device changes. For example, as the distance between the object in reality and the computing device decreases, the size of the object as presented on the display screen will increase; at this decreased distance, the size of the virtual article presented on the display screen should be bigger as well. Likewise, if the distance between the object in reality and the device increases, then the size of the object on the display will decrease; at this increased distance, the size of the virtual article presented on the display screen should be smaller. As such, the measurement scale can depend at least in part upon the distance between the device and the object in reality.

In some embodiments, the various embodiments of the present disclosure can improve a shopping experience for a user. For example, a user can use a camera on his/her computing device to capture an image (e.g., picture, video) of his/her living room (i.e., environment), which can include a back wall, a coffee table on the left side of the back wall, and a right wall attached and perpendicular to the back wall. The image of the living room can be displayed on a display screen on the computing device. The user can desire to buy a chair to place against the back wall, between the coffee table on the left and the wall on the right. The user's computing device can determine that the length of the coffee table is 200 pixels on the screen. The device can obtain information (e.g., from a distance measuring device, from the user) that the device was 5 feet away from the coffee table and/or back wall when the image was captured. The device can also obtain information that the real, physical length of the coffee table is 4 feet (e.g., determine the physical length based at least in part upon the information obtained about the distance between the device and coffee table, determine the physical length by utilizing object recognition technology, and/or obtain the physical length from the user, etc.). The device can determine a measurement scale specifying that at a distance of 5 feet, 1 foot in reality is equal to 50 pixels (and vice versa). The device can further determine (e.g., via image processing) the space between the coffee table and the right wall to be 250 pixels. Based on the measurement scale, the device can determine that only real-world correspondences that are 5 feet wide or less can fit in the space between the coffee table and the right wall. An electronic marketplace can utilize this information and provide to the user a list of chairs (i.e., real-world correspondences) that are at most 5 feet in width. The device can present on the screen a virtual article for each respective chair on the list, each virtual article being displayed in the space in the living room and being scaled appropriately based on the measurement scale (at most 250 pixels wide). As such, the user can see a virtual representation on the screen of how the chair would look in the space between the coffee table and right wall in his/her living room. The user can thus be in a better position to make a purchase.

Figure 1:
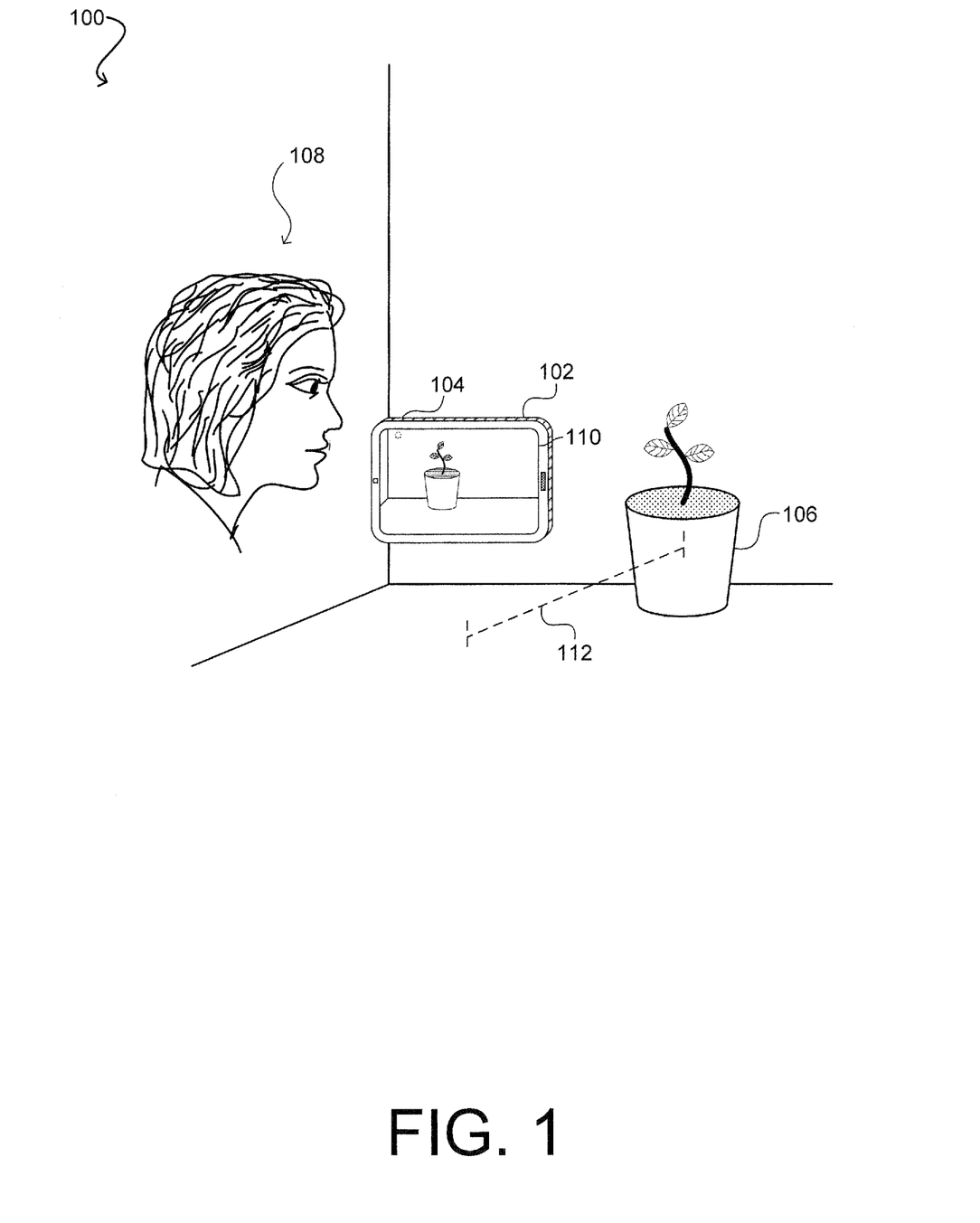
FIG. 1 illustrates an example environment in which aspects of the various embodiments can be utilized.

FIG. 1 illustrates an example environment in which aspects of the various embodiments can be utilized. The example environment 100 can comprise a computing device 102, at least one camera 104 (i.e., image capture component) on the computing device 102, a display screen 110 on the computing device 102, and an object in reality (i.e., physical object) 106. The computing device 102 can comprise the at least one camera 104 and the display screen 110. A user 108 of the computing device 102 can use the camera 104 to capture an image (e.g., picture, video, real-time video feed, etc.) of a perspective viewable to the camera 104. The perspective (i.e., view) in the captured image can include the object in reality 106.

The object in reality 106 can be any real-world item viewable by the at least one camera 104. For example, the object in reality (i.e., physical object) 106 can be a plant pot, as shown in FIG. 1. In some embodiments, the object in reality 106 can be a piece of furniture, a decoration, a piece of art (e.g., sculpture, sketch, painting, photograph, poster, etc.), an appliance, a household item, etc. The object in reality 106 in the captured image can be presented on the display screen 110 of the computing device 102. In some embodiments, the at least one camera 104 can capture an image of a view which includes multiple objects in reality.

As illustrated in the example environment 100, there can be a distance 112 between the computing device 102 and the object in reality 106. The computing device 102 can use various technologies available to the device 102 to obtain information about the distance 112. In some embodiments, the computing device 102 can have an ultrasonic sensor, an infrared (IR) sensor (e.g., IR camera), etc. For example, the at least one camera 104 on the computing device 102 can include an IR camera such that the device 102 can utilize the IR camera to measure the distance 112 between the device 102 and the object 106. In some embodiments, the computing device 102 can obtain information about the distance 112 from the user 108. For example, the device 102 can prompt the user 108 to input the distance 112 to the object 106. In another example, the device 102 can instruct the user 108 to position himself/herself a specified distance 112 (e.g., based on a specified/default distance parameter) away from the object 106, such that the specified distance can be readily obtained by, or be already "known" to, the device 102 (e.g., via the distance parameter, which can be stored on or accessible to the device).

Figure 2:
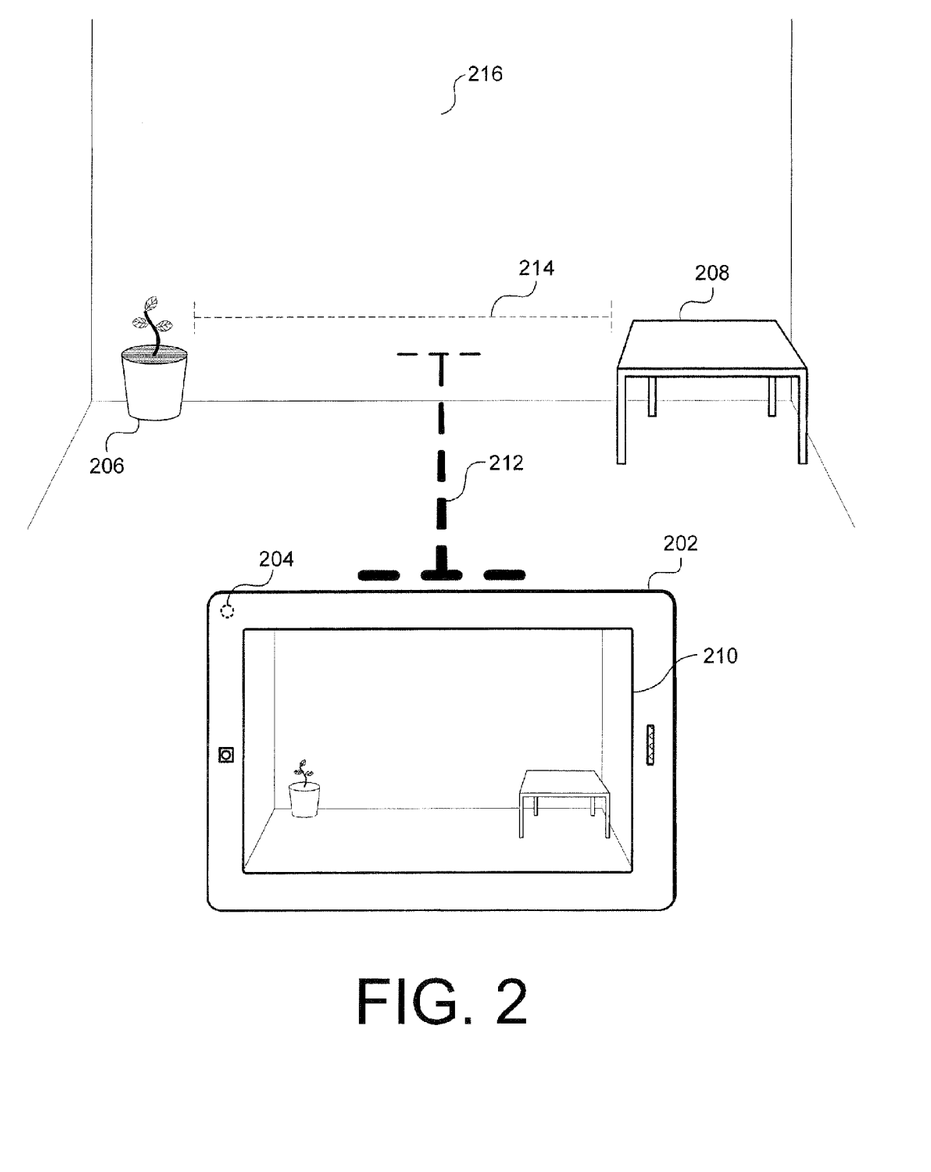
FIG. 2 illustrates an example embodiment for measuring objects in reality and viewing virtual articles.

FIG. 2 illustrates an example embodiment for measuring objects in reality and viewing virtual articles. The example embodiment can include a computing device 202 that comprises at least one camera 204 and a display screen 210. The computing device 202 can use the at least one camera 204 to capture an image of a view behind the computing device 202. There can also be one or more objects in reality, such as a plant pot 206 and/or an end table 208, in the view captured by the at least one camera 204. The captured image of the view, including the object(s) in reality (e.g., 206 and 208), can be presented on the display screen 210 of the computing device 202.

As shown in FIG. 2, there can be a distance 212 between the computing device 202 and the one or more objects in reality (e.g., 206 and 208). The distance 212 can be a linear distance in a substantially horizontal plane parallel, within an allowable deviation, to the floor/ground. The distance can also be, for example, substantially orthogonal (i.e., orthogonal within an allowable deviation) to the back wall 216. In some embodiments, the distances from the device 202 to each of multiple objects in reality can be similar (e.g., within an allowable deviation from one another); these distances can also be averaged to result in the distance 212. For example, if the device 202 is moved left in a vertical plane parallel to the back wall 216, then when the device 202 is in front of the plant pot 206, the distance between the device 202 and the pot 206 (i.e., "pot distance") will be similar to distance 212. Likewise, if the device 202 is moved right in the vertical plane parallel to the back wall 216, then when the device 202 is in front of the end table 208, the distance between the device 202 and the end table 208 (i.e., "table distance") will be similar to distance 212 (and to the pot distance). In some embodiments, when there are multiple objects, the distance 212 can be determined by averaging or taking the median of the distances between the device and each of the multiple objects in reality (e.g., pot distance and table distance). As mentioned above, information about distance (e.g., the measurement for distance 212) can be obtained in various ways, such as by utilizing an ultrasonic sensor, an IR sensor, a specified/default distance parameter, information from the user, or any combination thereof.

In some embodiments, an object in reality can be a wall, such as the back wall 216. The wall can include one or more edges, such as where the wall meets an adjacent wall. In some embodiments, the computing device 202 can utilize image processing to determine/obtain information about the wall (e.g., the shape of the wall, one or more dimensions of the wall, one or more boundaries of the wall, etc.). For example, the computing device 202 can capture an image of the back wall 216 and use edge/line detection applied to the captured image of the back wall 216 to determine one or more boundaries of the back wall 216, from which the shape, width, etc. of the back wall 216 can be inferred. Furthermore, the distance 212 between the device 202 and an object in reality can be the distance between the device 202 and the back wall 216.

The one or more objects in reality can be used for determining a measurement scale (which, in some embodiments, can comprise a conversion algorithm and/or ratio) useful for converting (back and forth) between sizes of objects in reality and their respective sizes on the display screen. In some embodiments, an object in reality can be provided intentionally for such purposes. For example, in some embodiments, a rectangular piece of paper (e.g., cardboard, plastic, etc.) of a known size (e.g., width and/or height) can be provided for use with the various embodiments of the present disclosure. The size of the paper in this example can be known to the device 202, or known to the user such that the device 202 can obtain the size from the user. Continuing with the example, the paper can also be of a specific color and/or pattern to facilitate detection by the device 202 (e.g., by the camera 204 and/or by image processing on the device 202). The paper (i.e., object in reality) can be placed on a wall (e.g., back wall 216) at a certain distance (e.g., distance 212) away from the device 202. The at least one camera 204 can capture an image of the paper on the back wall 216 and present the paper on the display screen 210. Since the actual size of the paper in reality is known (or can be obtained), the device 202 can compare the actual size of the paper with the size of the paper as displayed on the display screen 210 to determine a measurement scale (e.g., based at least in part upon a conversion algorithm and/or ratio to be applied) for converting (back and forth) between the size of an object in reality and the size of the object as it would appear on the display screen 210. Moreover, since the distance between the paper and the device 202 can be determined/obtained (as discussed above), the measurement scale (e.g., the conversion algorithm/ratio) can be adjusted in response to any changes to the distance (e.g., if the device 202 moves closer or farther away from the paper).

In some embodiments, any object in reality, such as the plant pot 206, the end table 208, the back wall 216, or any combination thereof can be used for determining the measurement scale. For example, an object such as the back wall 216 can be used for determining the measurement scale. In some embodiments, the size (e.g., width) of the back wall 216 can be determined (obtained) from the user to be 11 feet. In some embodiments, the size (e.g., width) back wall 216 can be determined to be 11 feet based at least in part upon utilizing the distance between the wall 216 and the device 202. Continuing with the example, the device 202 can determine that the size (width) of the back wall 216 as presented on the display screen 210 is 1100 pixels. Accordingly, a measurement scale (e.g., algorithm/ratio) can be determined, specifying that, assuming the distance 212 is constant, each feet in reality corresponds to 100 pixels on the device 202 and vice versa. It should follow that if the plant pot 206 is one foot tall by one foot wide, then it will be 100 pixels by 100 pixels on the display screen 210. Likewise, if the end table 208 is 2.5 feet wide and 1.5 feet tall in reality, then it will be 250 pixels wide and 150 pixels tall on the display screen 100. Moreover, information about the distance 212 can be determined/obtained such that the measurement scale can be adjusted appropriated if there are any changes to the distance 212. Based on the measurement scale, any size of an object in reality can be converted to its respective size on the display screen 210 and any size of a virtual article on the display screen 210 can be converted to its respective size in reality.

In some embodiments, there can be a separation of space between two or more objects in reality. For example, as shown in FIG. 2, there can be a distance 214 between the plant pot 206 and the end table 208. Using the determined measurement scale, the distance 214 in reality can be calculated from the width of the empty space displayed on the display screen 210. For example, image processing (e.g., line/edge detection, object recognition, etc.) running on the device 202 can be used detect the plant pot 206 and the end table 208 displayed on the display screen 210. Then the measurement scale can be applied on the number of pixels in between the pot 206 and the table 208 on the screen 210 to obtain the size/width of the space (i.e., distance 214) in reality. For example, if the number of pixels between the pot 206 and table 208 is determined to be 650 pixels, then distance 214 will be 6.5 feet in reality. In some embodiments, information about the distance 214 can be provided/supplemented by the user to the device 202.

Figure 3:
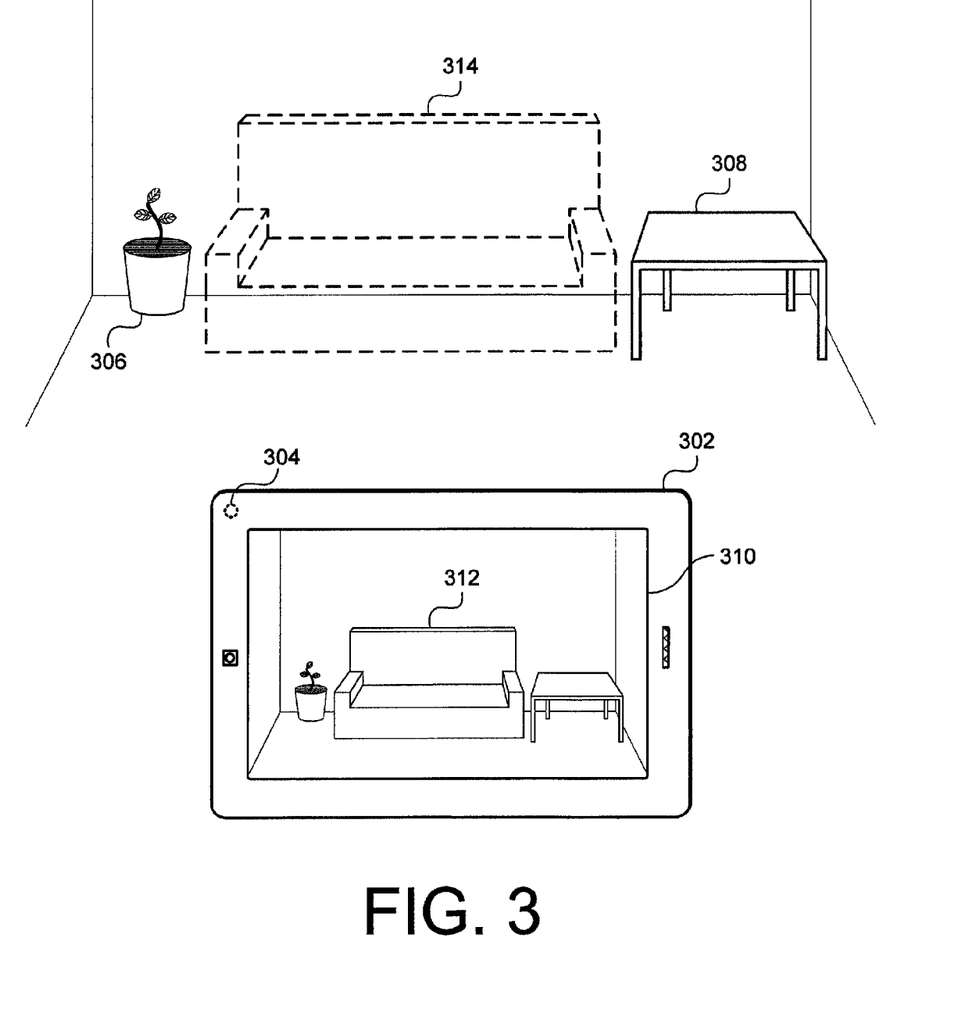
FIG. 3 illustrates an example embodiment for measuring objects in reality and viewing virtual articles.

FIG. 3 illustrates an example embodiment for measuring objects in reality and viewing virtual articles. In the example embodiment, there can be a computing device 302 comprising at least one camera 304 and a display screen 310. Having determined the size of the free/empty space between two or more objects (e.g., pot 206 and table 308) presented in the display screen 310 and/or the size of the empty space in reality, the example embodiment can provide one or more virtual articles 312 to be presented on the display screen 310 in conjunction with the image captured by the camera 304 of the view behind the device 302 including the objects in reality (e.g., 306 and 308).

The example embodiment can elect to present the virtual article 312 based at least in part upon the virtual article's size on screen (e.g., pixel size) and/or its corresponding size in reality (e.g., in feet, meters, etc.). For example, the example embodiment can choose the virtual article 312 because it had a pixel width of 625 pixels, which is less than the pixel width between the pot 306 and the table 308 (e.g., 650 pixels) displayed on the screen 310. Additionally or alternatively, the example embodiment can obtain information about the virtual article 312, which can include a physical dimension of a real-world correspondence of the virtual article 312. For example, if the virtual article 312 represented a product/object in reality 314, the example embodiment can obtain a product detail of the object in reality 314 corresponding to and/or represented by the virtual article 312; the product detail can include an actual, physical width of the object in reality 314. If the physical width of the object in reality 314 is 6.25 feet in this example, then the object 314 can fit between the pot 306 and table 308 because the distance between the pot 306 and the table 308 is 6.5 feet.

By providing the virtual article 312 to be presented on the display screen 310 in conjunction with the captured image of the view and objects in reality (e.g., 306 and 308), a user of the device 302 can more easily imagine how a real-world correspondence 314 of the virtual article 312 would appear, without having to physically obtain the correspondence 314. As illustrated in the example embodiment of FIG. 3, the virtual article 312 can correspond to a couch in reality 314. However, the user does not need to actually get/buy the couch 314, assemble it, and physically place it in his/her living room to get a sense of how the couch 314 would look and/or to determine whether he/she likes the couch 314. If the couch 314 does not fit, match, and/or if the user does not like the couch 314, then he/she might still have to return or exchange the couch 314, causing much trouble and effort. Instead, in accordance with the present disclosure, the user can just enable his/her computing device 302 to provide a virtual article 312 corresponding to the couch 314 to be presented along with his/her living room and other items (e.g., 306 and 308) on the display screen 210 of the device 302. As such, the time, effort, and/or resources of the user and the party providing (e.g., selling) the couch 314 are saved.

Figure 4A:
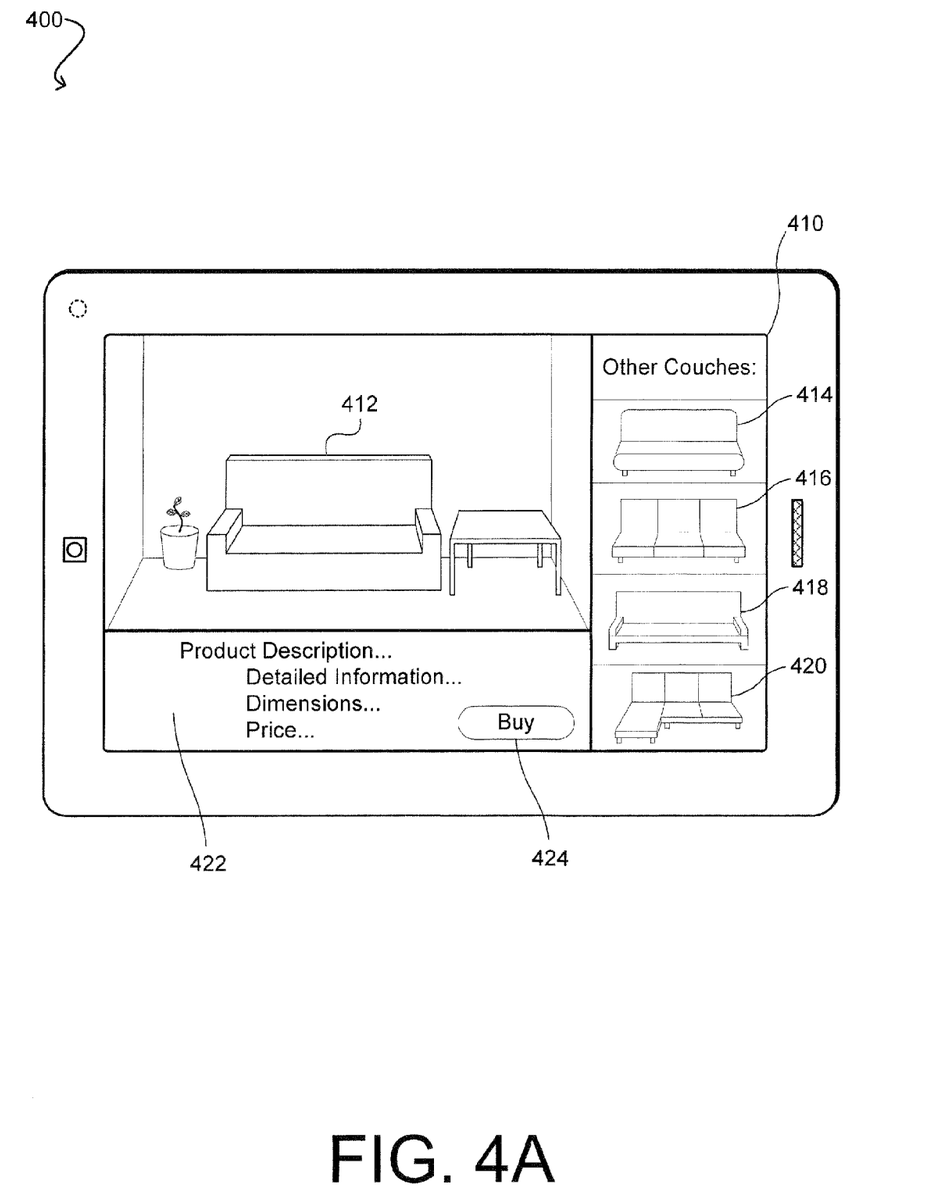
FIG. 4A illustrates an example device embodiment for measuring objects in reality and viewing virtual articles.

FIG. 4A illustrates an example device embodiment for measuring objects in reality and viewing virtual articles. The example device embodiment 400 can comprise a display screen 410. In FIG. 4A, the example device embodiment 400 can present one or more virtual articles (e.g., 412, 414, 416, 418, 428, etc.) that fit within the environment (e.g., that fit within the space between the plant pot and the end table). For example, there can be a shopping catalog that contains various products. If the user desires to view couches, the shopping catalog can be filtered to include only those couches that fit within the environment. The user can select a couch 412 to view in conjunction with the environment (e.g., overlaying his/her room). Other couches (e.g., 414, 416, 418, 420, etc.) that fit can be provided to the user as well. There can also be additional information 422 provided to the user for the currently selected item 412. The information 422 can include a product description, detailed information about the product, dimension (e.g., width, length, height, weight) of the product, product location, availability, price, color, pattern, style, etc. There can also be buttons for user interaction, such as a button 424 to purchase the item 412.

A person of ordinary skill in the art would understand that various other elements and interactivity can be provided to the user, such as additional buttons, addition information, and addition functions. For example, the device embodiment can allow the user to change the orientation of the item 412 presented with the environment. In another example, the user can move the item 412 and/or other objects within the environment. In a further example, the user can zoom in and out. In some embodiments, the device embodiment can allow the user to change the lighting of the environment presented on the display screen 410.

Figure 4B:
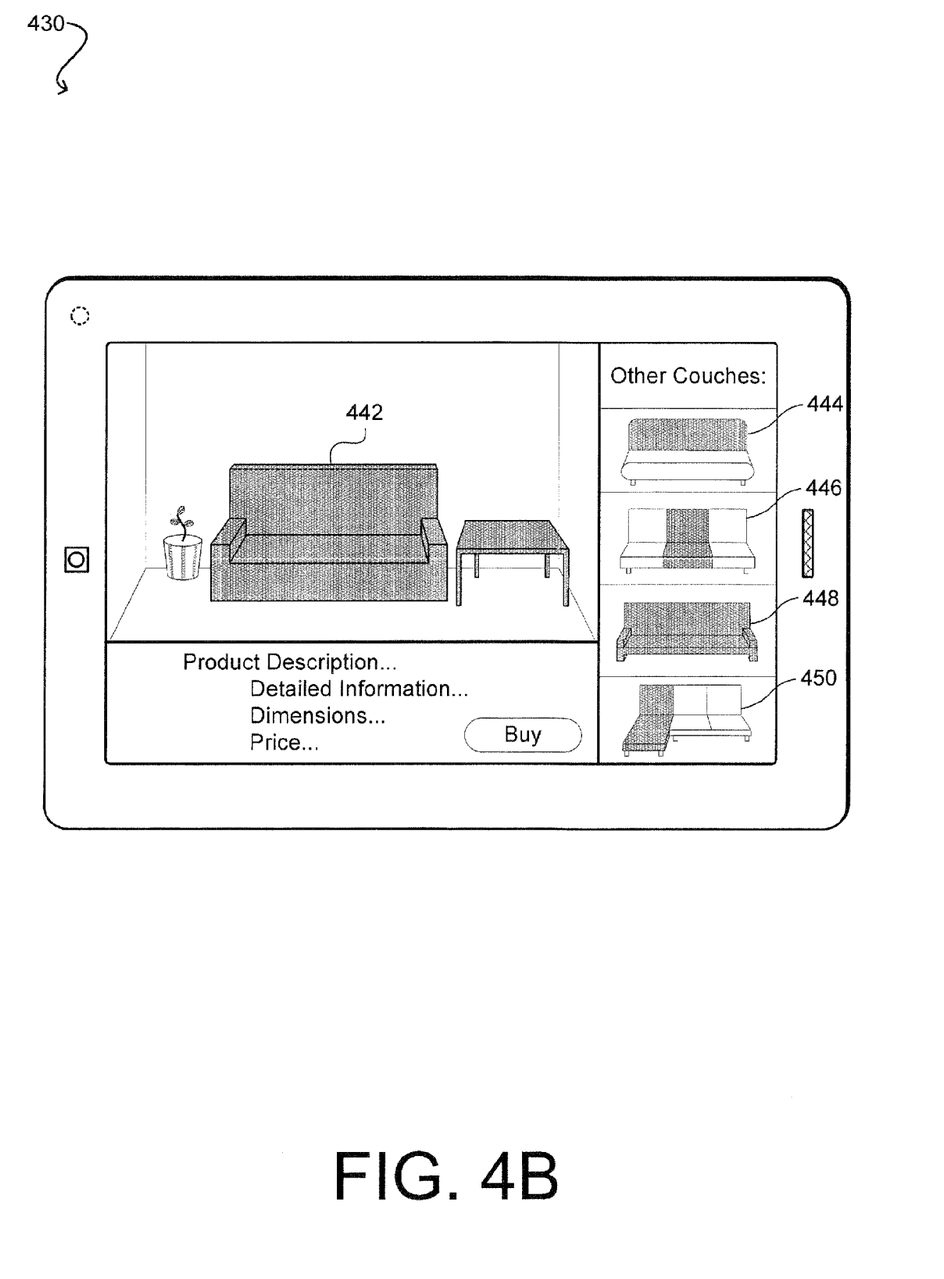
FIG. 4B illustrates an example device embodiment for measuring objects in reality and viewing virtual articles.

FIG. 4B illustrates an example device embodiment for measuring objects in reality and viewing virtual articles. The example device embodiment 430 can take into consideration the any color and/or pattern schemes within the environment. For example, the user can instruct the device to take into account any color/pattern scheme(s) present within the environment. In some embodiments, image processing can be performed with respect to the captured image of the environment and the one or more objects in reality, in order to detect/determine the color/pattern scheme(s) present. If the device embodiment determines that a particular color/pattern scheme(s) is present, then the device embodiment can attempt to provide articles that match the color/pattern scheme(s).

For example, as shown in FIG. 4B, the plant pot and the end table have a particular color/pattern scheme. The device can detect and determine the color/pattern scheme, and filter the shopping catalog such that only those articles (e.g., 442, 444, 446, 448, 450, etc.) matching the scheme will be provided to the user.

Figure 4C:
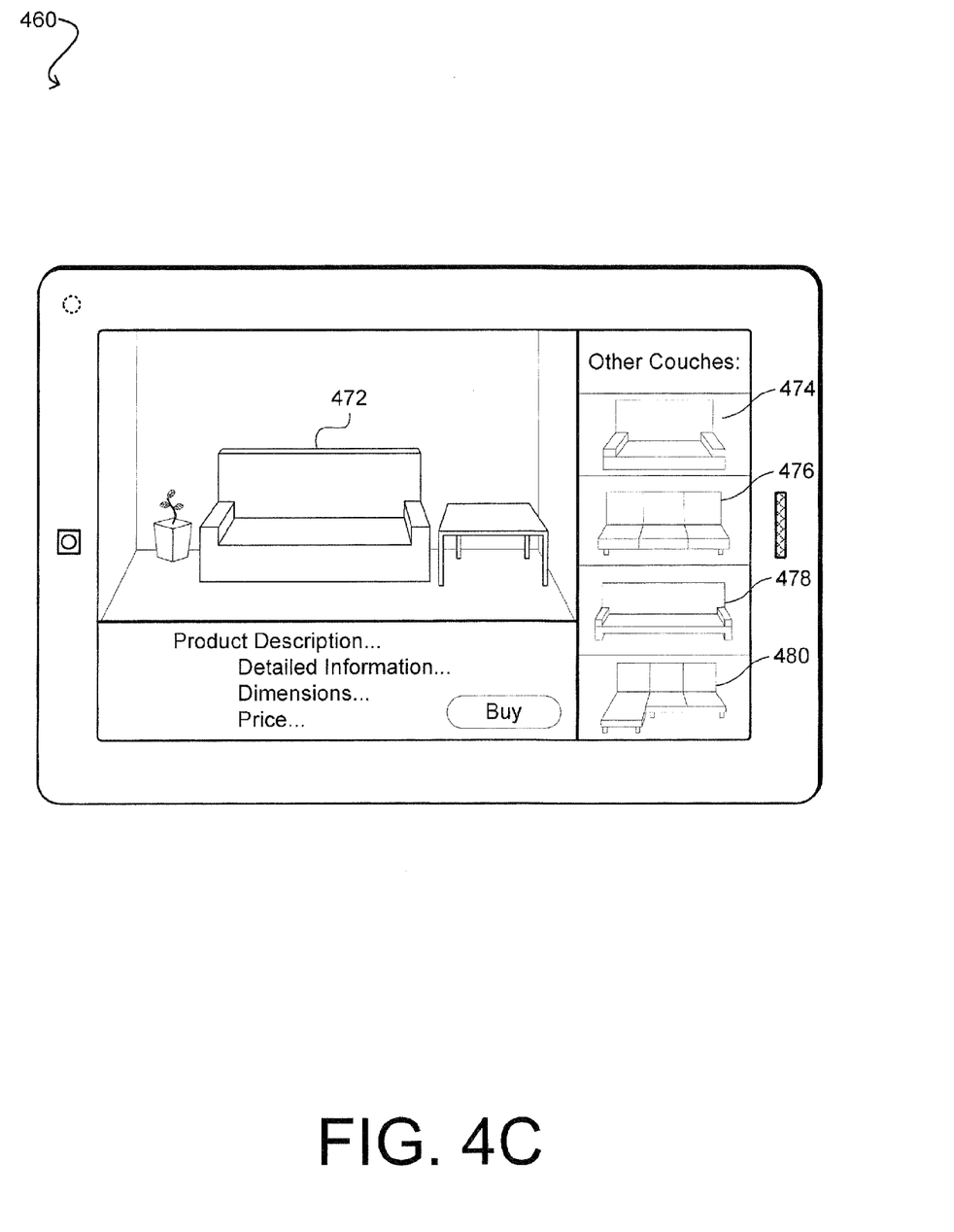
FIG. 4C illustrates an example device embodiment for measuring objects in reality and viewing virtual articles.

FIG. 4C illustrates an example device embodiment for measuring objects in reality and viewing virtual articles. The example device embodiment 460 can take into account one or more styles of the environment and the objects in reality. For example, the user can instruct the device to take into account any style scheme(s) present within the environment. In some embodiments, image processing (e.g., line/edge detection, object recognition) can be utilized to detect/determine the style(s) associated with the environment and/or the objects. If the device embodiment determines that a particular style scheme(s) is present, then the device embodiment can attempt to provide articles that match the style scheme(s).

For example, as shown in FIG. 4B, the plant pot and the end table have a particular style scheme (e.g., a straight edge style, an angular style, etc.). The device can detect and determine the style scheme, and filter the shopping catalog such that only those articles (e.g., 472, 474, 476, 478, 480, etc.) matching the scheme will be provided to the user. In addition, in some embodiments, one or more schemes related to style, color, pattern, or any combination thereof can be taken into consideration.

Figure 5:
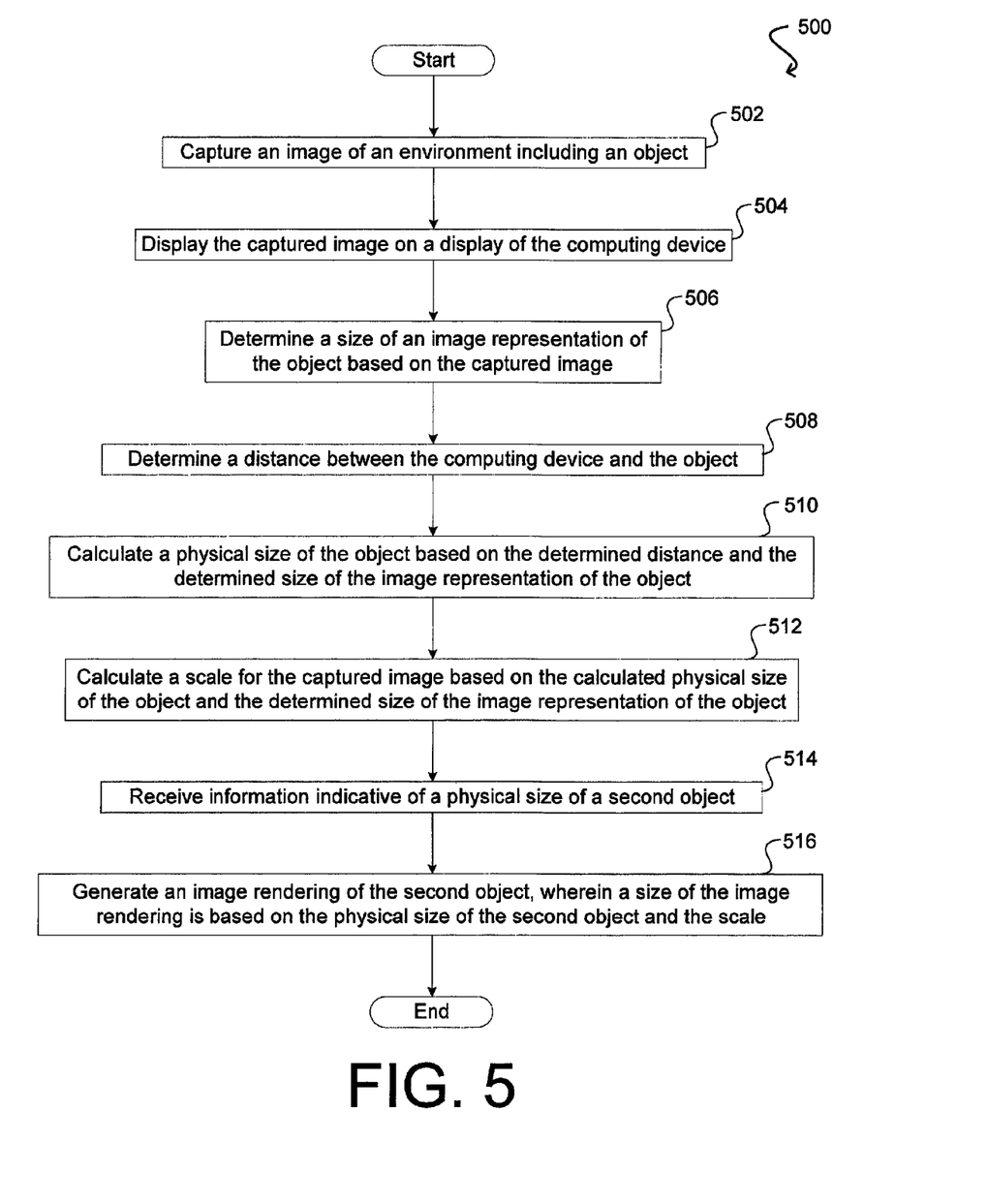
FIG. 5 illustrates an example method embodiment for measuring objects in reality and viewing virtual articles.

FIG. 5 illustrates an example method embodiment 500 embodiment for measuring objects in reality and viewing virtual articles. It should be understood that there can be additional, fewer, or alternative steps performed in similar or alternative orders, or in parallel, within the scope of the various embodiments unless otherwise stated. The example method embodiment 500 can start with capturing an image of an environment including an object, at step 502. The image can be captured using at least one camera on a computing device. At step 504, the example method 500 can display the captured image on a display of the computing device. For example, the captured image can be at least one video image frame of a video feed including the environment and the object, the video feed can be displayed on the display in real-time. In another example, the captured image can be a still picture of the environment and the object. In some embodiments, the display can comprise a touch sensor; in other words, the display can be a touch screen.

At step 506, the example method embodiment 500 can determine a size of an image representation of the object based on the captured image. In some embodiments, the size of the image representation of the object can be determined (e.g., estimated) based on the captured image, without having to actually present (e.g., render) the object on the display. For example, the method can determine from the captured image that if the object was to be presented on display, it would appear 100 pixels wide and/or 200 pixels high. In some embodiments, the example method can determine a size of the image representation of the object by presenting the object on the display. For example, the object presented on the display can be determined to be 100 pixels wide and/or 200 pixels high. In some embodiments, image processing (e.g., line/edge detection, object recognition) can be utilized in determining the size of the image representation of the object.

At step 508, the example method 500 can determine a distance between the computing device and the object. In some embodiments, the computing device can utilize an ultrasonic sensor, an infrared (IR) sensor, the camera, and/or other distance measuring utilities (e.g., stereoscopic cameras, RGB cameras for sensing UV light, laser beams, sonar pulses, etc.) to determine the distance between the device and the object. In some embodiments, the distance between the computing device and the object can be determined/obtained from the user and/or from a specified/default distance parameter (e.g., which can be stored in a memory of the device). In some embodiments, the distance between the computing device and the object can be a linear distance having an axis substantially orthogonal (i.e., within an allowable deviation from being orthogonal) with respect to a vertical plane such as a back wall of the environment.

The example method 500 can calculate a physical size of the object based on the determined distance and the determined size of the image representation of the object, at step 510. The example method 500 can calculate a scale for the captured image based on the calculated physical size of the object and the determined size of the image representation of the object, at step 512. For example, the scale can be useful for converting back and forth between a pixel size on the display and a feet (or meter, etc.) measurement in reality (e.g., in the environment). In some embodiments, the calculating of the scale can be based at least in part upon comparing a physical size of the object in reality with the determined size of image representation of the object as presented on the display.

In some embodiments, calculating of the scale can include determining a conversion algorithm/ratio (e.g., 1 foot to 100 pixels). For example, if the actual size of an object in realty is 2 feet tall and the determined size/height of the image representation of the object on the display is 200 pixels, then the example embodiment 500 can determine that 1 foot converts to 100 pixels and vice versa (assuming distance is constant). In some embodiments, the determining of the scale can be based at least in part upon the information obtained about the distance between the computing device and the object in reality. For example, the scale can specify that 1 foot equals 100 pixels when the distance is 10 feet, and that 1 foot equals 200 pixels when the distance is 15 feet. As such, in some embodiments, the scale can be variable/adjustable depending on the distance between the computing device and the object in reality.

At step 514, the example method 500 can receive information indicative of a physical size of a second object. At step 516, the method can generate an image rendering of the second object, wherein a size of the image rendering is based on the physical size of the second object and the scale for the captured image. For example, in the context of an online electronic marketplace, the second object can depict and/or be a representation of a corresponding product in reality that is listed for sale. The image rendering of the second object can be displayed on the display and can be scaled in size based at least in part upon the scale. For example, if the corresponding product in reality is 5 feet wide and 3 feet tall, then the image rendering of the second object can be scaled in size and displayed on the display as being 500 pixels wide and 300 pixels tall. As such, the image rendering of the second object can be presented in a scaled size with respect to the environment and the object on the display, which can allow the user to get a feel for what the actual corresponding product would look like in the environment and/or how the actual product would fit in the environment.

Figure 6:
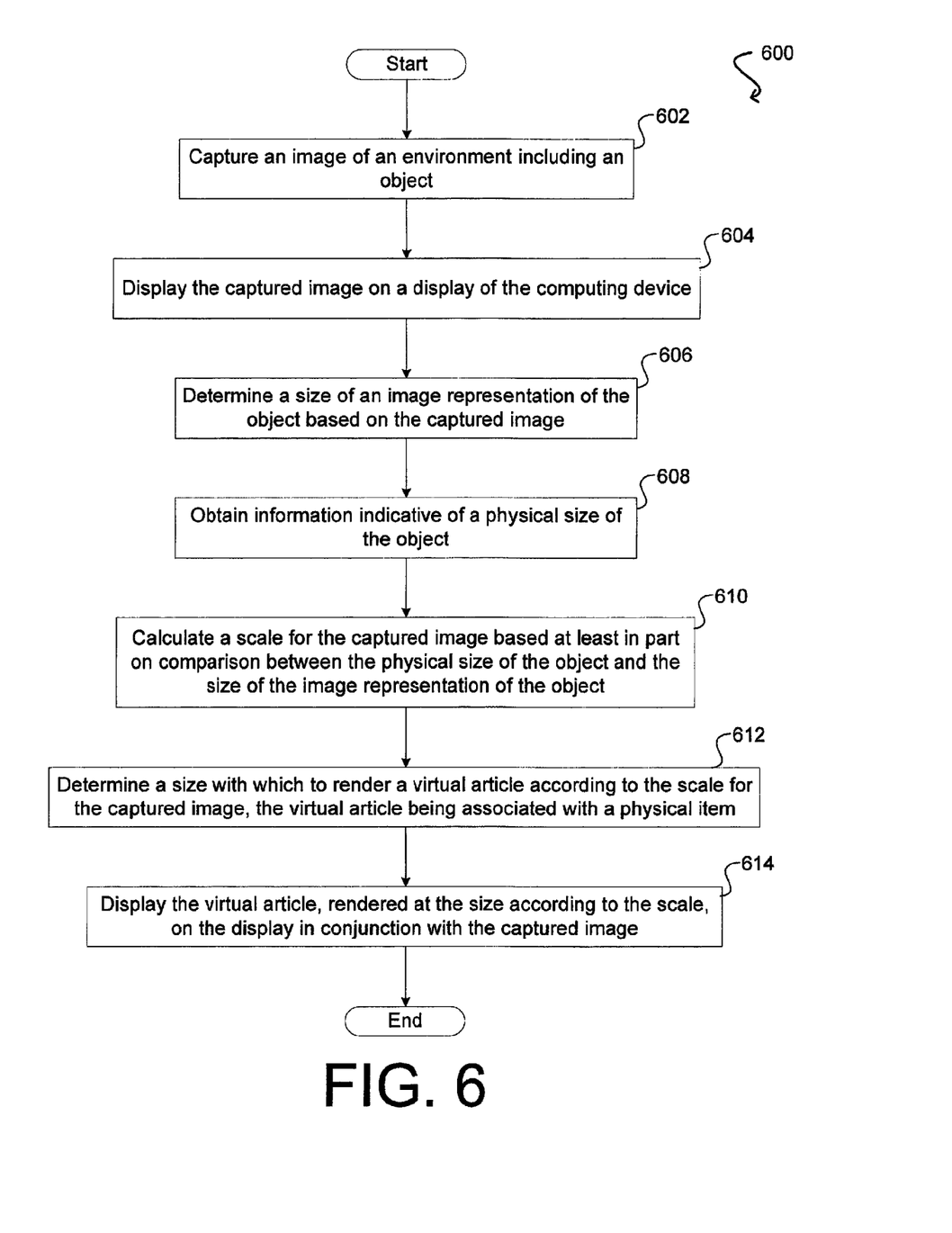
FIG. 6 illustrates an example method embodiment for measuring objects in reality and viewing virtual articles.

FIG. 6 illustrates an example method embodiment 600 for measuring objects in reality and viewing virtual articles. Again, it should be understood that there can be additional, fewer, or alternative steps performed in similar or alternative orders, or in parallel, within the scope of the various embodiments unless otherwise stated. The example method embodiment 600 can start with capturing an image of an environment including an object, at step 602. The image can be captured using at least one camera on a computing device. The example method embodiment 600 can display the captured image on a display of the computing device, at step 604.

At step 606, the example method 600 can determine a size of an image representation of the object based on the captured image. At step 608, the example method 600 can obtain information indicative of a physical size of the object. In some embodiments, the computing device can utilize an ultrasonic sensor, an infrared (IR) sensor, the camera, and/or other distance measuring utilities (e.g., stereoscopic cameras, RGB cameras for sensing UV light, laser beams, sonar pulses, etc.) to determine/obtain information indicative of the physical size of the object. In some embodiments, information indicative of the physical size of the object can be obtained from the user and/or from a specified/default distance parameter (e.g., which can be stored in a memory of the device).

At step 610, the method 600 can calculate a scale for the captured image based at least in part on comparison between the physical size of the object and the size of the image representation of the object. At step 612, the method 600 can determine a size with which to render a virtual article according to the scale for the captured image, the virtual article being associated with a physical item. The method 600 can display the virtual article, rendered at the size according to the scale, on the display in conjunction with the captured image, at step 614.

In some embodiments, the environment with the object(s) in reality and the virtual article(s) can be captured and/or saved. For example, the scene of the environment, object(s), and virtual article(s) can be saved as a screen shot. The saved screen can be stored on the device and/or sent to another recipient(s) (e.g., via email. SMS text, social networking, etc.). In some embodiments, the saved scene can be modified by moving, adding, and/or removing items/articles. In some embodiments, the environment, object(s), and virtual article(s) can be saved and/or retrieved on an online electronic marketplace.

In some embodiments, a change in rotation and/or orientation of the computing device can be determined by a gyroscope, an accelerometer, a compass, and/or other similar utilities on the device. The environment, the one or more objects in reality, and/or the one or more virtual articles presented on the display screen can be adjusted accordingly based at least in part upon the detected change in rotation and/or orientation.

Various embodiments consistent with the present disclosure can be implemented for any camera or multiple cameras on the computing device. For example, in some embodiments, a front facing camera can be utilized. Continuing with the example, a user can hold a card of a known size in front the front facing camera. Based on the known (e.g., readily obtainable) size of the card, the device can obtain information about (e.g., calculate, prompt for) the distance from the card to the device. Based at least in part on the known size of the card (and, in some embodiments, the distance), the device can determine a measurement scale.

Figure 7:
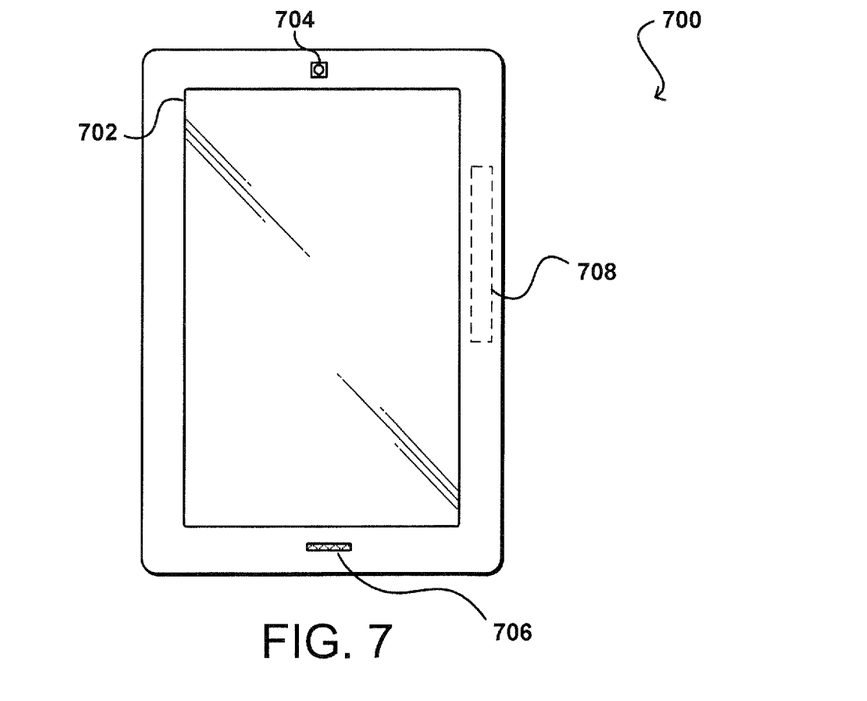
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
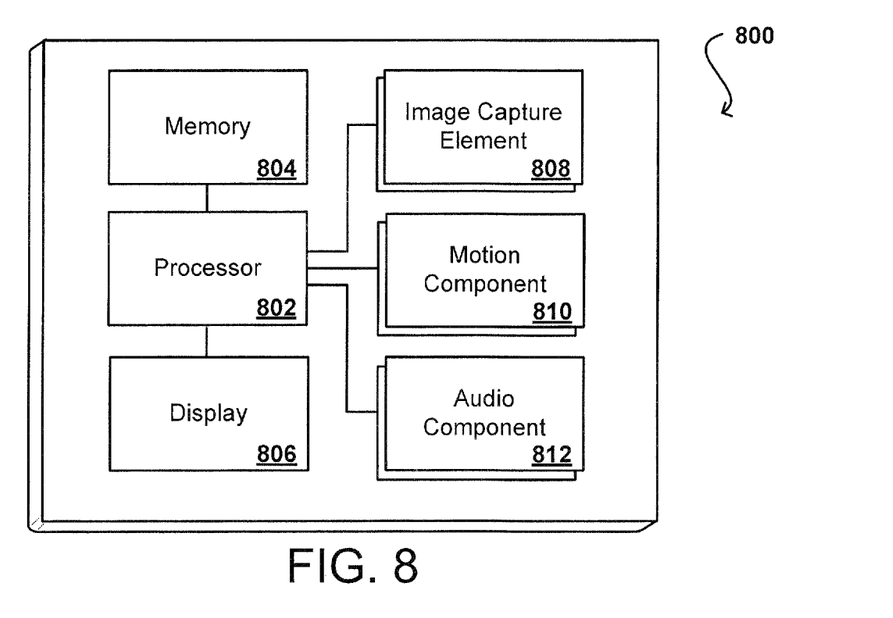
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
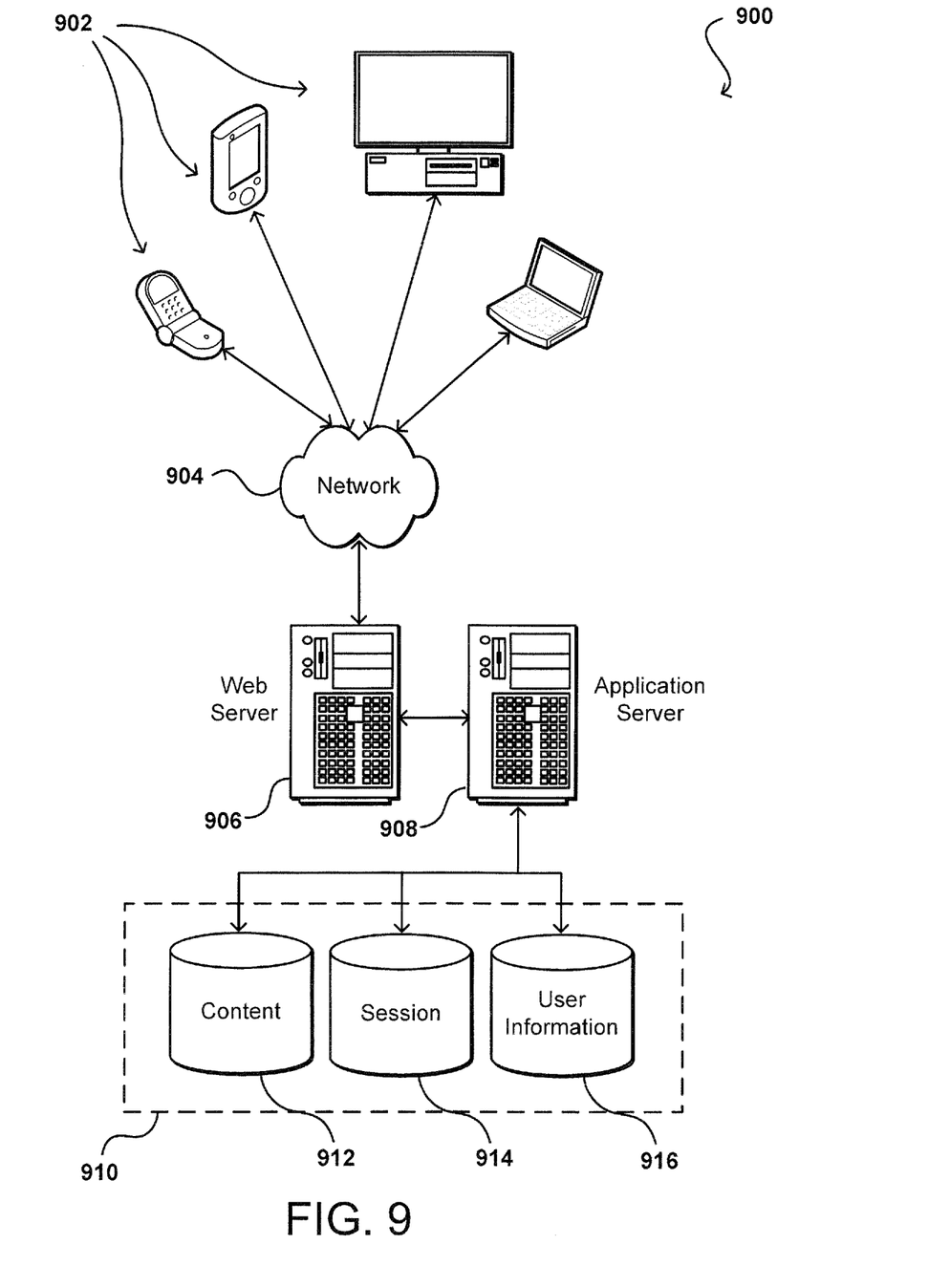
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
    capturing an image of an environment including an object, the image being captured using a camera of a computing device;
    determining a size of an image representation of the object based on the captured image;
    determining a distance between the computing device and the object;
    calculating a physical size of the object based on the determined distance and the determined size of the image representation of the object;
    calculating a scale for the captured image based on the calculated physical size of the object and the determined size of the image representation of the object;
    receiving information at least indicative of a physical size of a second object;
    generating an image rendering of the second object, wherein a size of the image rendering is based on the physical size of the second object and the scale for the captured image; and
    displaying the image rendering of the second object and the image representation of the object based on the captured image on a display of the computing device.

2. The computer-implemented method of claim 1, wherein the determining of the size of the image representation of the object includes determining a size of the image representation in pixels.

3. The computer-implemented method of claim 1, wherein the determining of the distance between the computing device and the object utilizes at least one of an ultrasonic sensor on the computing device, an infrared sensor on the computing device, a parameter stored in a memory of the computing device, a stereoscopic camera on the computing device, a laser beam emitted from the computing device, a sonar pulse emitted from the computing device, a RGB camera on the computing device, or a user input.

4. The computer-implemented method of claim 1, wherein calculating the scale for the captured image includes determining a ratio between the physical size of the object and the size of the image representation of the object.

5. The computer-implemented method of claim 1, wherein the generated image rendering of the second object is displayed on the display screen with the captured image.

6. The computer-implemented method of claim 1, wherein the information at least indicative of the physical size of the second object further indicates at least one of a color, a pattern or a style of the second object.

7. A computer-implemented method comprising:
    capturing an image of an environment including an object, the image being captured using a camera of a computing device;
    determining a size of an image representation of the object based on the captured image;
    obtaining information indicative of a physical size of the object;
    calculating a scale for the captured image based at least in part on comparison between the physical size of the object and the size of the image representation of the object;
    receiving information at least indicative of a physical size of a physical item;
    determining a size with which to render a virtual article according to the scale for the captured image and the physical size of the physical item, the virtual article being associated with the physical item; and displaying the virtual article, rendered at the size according to the scale, and the image representation of the object based on the captured image on a display.

8. The computer-implemented method of claim 7, wherein obtaining information indicative of the physical size of the object includes receiving a user input that includes information indicative of an actual size of the object.

9. The computer-implemented method of claim 7, further comprising:

determining a distance between the computing device and the object, wherein obtaining information indicative of the physical size of the object includes calculating an actual size of the object based on the distance and the size of the image representation of the object.

10. The computer-implemented method of claim 7, wherein the object in the environment and the physical item corresponding to the virtual article are each at least one of a piece of furniture, an appliance, a fixture, a wall, a piece of art, a decorative item, or a textile.

11. The computer-implemented method of claim 7, further comprising:

sending to one or more recipients an image including the captured image displayed in conjunction with the virtual article.

12. The computer-implemented method of claim 7, further comprising:

obtaining information about a change in a distance between the computing device and the object in the environment; and adjusting the scale based at least in part on the change in the distance between the computing device and the object in the environment.

13. The computer-implemented method of claim 7, further comprising:

adjusting a position of the virtual article on the display based on a user request.

14. The computer-implemented method of claim 13, wherein the adjusting of the position of the virtual article comprises modifying at least one of a location, a rotation, or an orientation of the virtual article on the display.

15. The computer-implemented method of claim 7, wherein the information at least indicative of the physical size of the second object further indicates at least one of a color, a pattern or a style of the second object.

16. A computing device comprising:
at least one camera;
a display;
a processor; and
a memory device including instructions that, when executed by the processor, cause the computing device to:
capture an image of an environment including an object, the image being captured using the at least one camera;
determine a size of an image representation of the object based on the captured image;
obtain information indicative of a physical size of the object;
calculate a scale for the captured image based at least in part on comparison between the physical size of the object and the size of the image representation of the object;
receive information at least indicative of a physical size of a physical item;
determine a size with which to render a virtual article according to the scale for the captured image and the physical size of the physical item, the virtual article being associated with a physical item; and
display the virtual article, rendered at the size according to the scale, and the image representation of the object based on the captured image on the display.

17. The computing device of claim 16, further comprising:
at least one of an ultrasonic sensor, an infrared sensor, an ultraviolet sensor, a stereoscopic camera, a RGB camera, a laser beam sensor, or a sonar pulse sensor configured to be utilized at least in part for determining a distance between the computing device and the object in the environment.

18. The computing device of claim 16, wherein the instructions cause the computing device to further determine a distance between the computing device and the object in the environment based at least in part on at least one of a parameter stored in the memory device of the computing device or a user input.

19. The computing device of claim 16, further comprising:
a transceiver configured to send to one or more recipients an image including the captured image displayed with the virtual article.

20. A non-transitory computer-readable storage medium including instructions for identifying elements, the instructions when executed by a processor of a computing device causing the computing device to:
capture an image of an environment including an object, the image being captured using a camera on the computing device;
determine a size of an image representation of the object based on the captured image;
obtain information indicative of a physical size of the object;
calculate a scale for the captured image based at least in part on comparison between the physical size of the object and the size of the image representation of the object;
receive information at least indicative of a physical size of a physical item;
determine a size with which to render a virtual article according to the scale for the captured image and the physical size of the physical item, the virtual article being associated with a physical item; and
display the virtual article, rendered at the size according to the scale, and the image representation of the object based on the captured image on a display.

21. The non-transitory computer-readable storage medium of claim 20, wherein the instructions cause the computing device to further:
obtain information about a change in a distance between the computing device and the object in the environment; and
adjust the scale based at least in part on the change in the distance between the computing device and the object in the environment.

22. The non-transitory computer-readable storage medium of claim 20, wherein the captured image includes at least one other object in the environment and wherein the physical item corresponding to the virtual article has a physical size capable of fitting with the object and the at least one other object in the environment.

* * * * *